(12) United States Patent
Watanabe et al.

(10) Patent No.: US 9,460,370 B2
(45) Date of Patent: Oct. 4, 2016

(54) CARD STORAGE AND EJECTION MODULE

(71) Applicant: NIDEC SANKYO CORPORATION, Suwa-gun, Nagano (JP)

(72) Inventors: Takeki Watanabe, Nagano (JP); Toshio Tatai, Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 0 days.

(21) Appl. No.: 14/843,361

(22) Filed: Sep. 2, 2015

(65) Prior Publication Data

US 2016/0070993 A1 Mar. 10, 2016

Related U.S. Application Data

(60) Provisional application No. 62/046,402, filed on Sep. 5, 2014.

(30) Foreign Application Priority Data

Oct. 30, 2014 (JP) .................................. 2014-221544

(51) Int. Cl.
*G06K 13/08* (2006.01)
*G06K 13/10* (2006.01)

(52) U.S. Cl.
CPC ..................... *G06K 13/10* (2013.01)

(58) Field of Classification Search
CPC .. G06K 13/07; G06K 13/0812; G06K 13/10; G06K 13/12; G06K 13/14

USPC ......................................... 235/379, 475, 479
See application file for complete search history.

(56) References Cited

U.S. PATENT DOCUMENTS

| | | | | |
|---|---|---|---|---|
| 7,387,257 B2 * | 6/2008 | Suzuki | ................... | G06K 1/121 235/486 |
| 7,870,996 B1 * | 1/2011 | Graef | ................. | G07D 11/0018 235/379 |
| 8,561,887 B1 * | 10/2013 | Kovacs | .............. | G07D 11/0063 235/379 |
| 8,807,423 B2 * | 8/2014 | Cha | .................... | G07D 11/0003 235/379 |

FOREIGN PATENT DOCUMENTS

CN 103544768 A 1/2014

* cited by examiner

*Primary Examiner* — Seung Lee
(74) *Attorney, Agent, or Firm* — Cantor Colburn LLP

(57) ABSTRACT

A card storage and ejection module may include a card storage cassette comprising a plurality of card storage parts each of which stores one card; a lifting mechanism structured to lift and lower the card storage cassette; and a support frame which supports the card storage cassette. The plurality of the card storage parts may be disposed so as to be overlapped with each other in an upper and lower direction. The lifting mechanism may include a parallel link mechanism having at least two link arms which connect the support frame with the card storage cassette and are disposed in an aligned state in a horizontal direction so as to be parallel to each other for lifting and lowering the card storage cassette in a state that a horizontal posture of the card storage cassette is maintained.

22 Claims, 10 Drawing Sheets

Fig. 9A
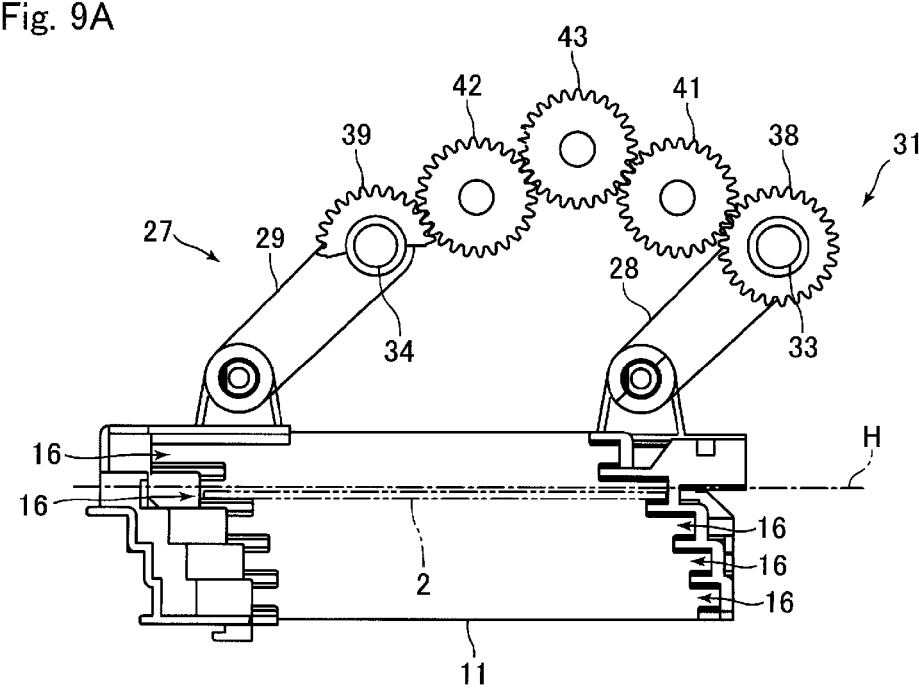
Fig. 9B
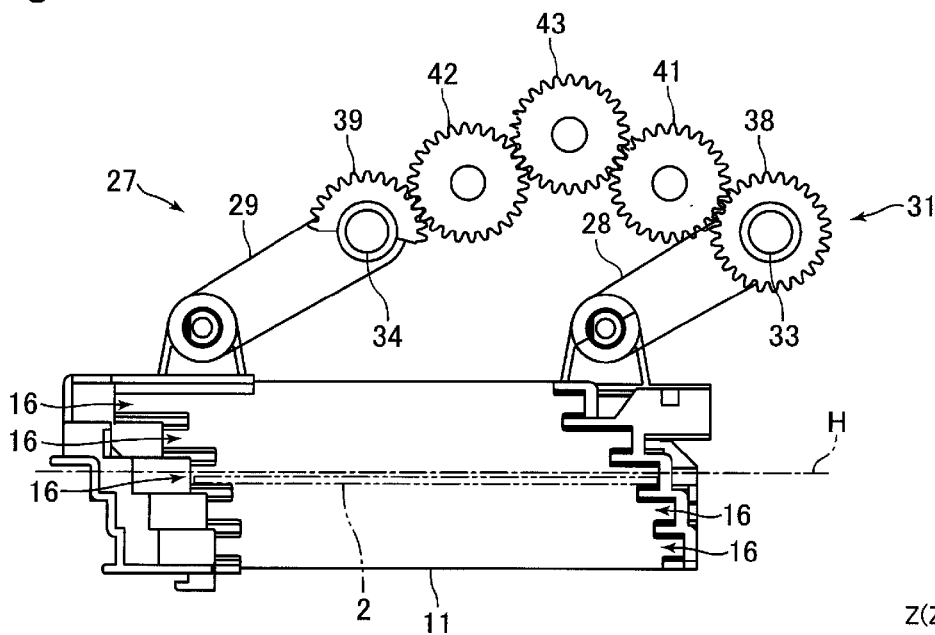
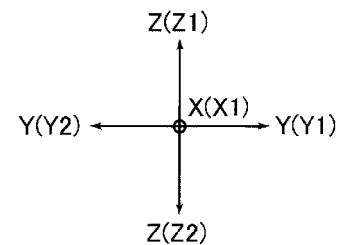

CARD STORAGE AND EJECTION MODULE

CROSS REFERENCE TO RELATED APPLICATIONS

The present application claims the benefit of priority under 35 U.S.C. §119(e) based on U.S. Provisional Application Ser. No. 62/046,402 filed on Sep. 5, 2014, the entire content of which is also incorporated herein by reference. Additionally, the present application claims priority under 35 U.S.C. §119 to Japanese Application No. 2014-221544 filed Oct. 30, 2014, the entire content of which is incorporated herein by reference.

FIELD OF THE INVENTION

At least an embodiment of the present invention may relate to a card storage and ejection module structured to perform a card storing operation for storing a card ejected from a card reader and a card ejecting operation for ejecting a stored card toward the card reader.

BACKGROUND

Conventionally, a card collecting and processing apparatus has been known which includes a card reader formed with a card conveying passage in its inside, a card collection cassette, and a lifting mechanism structured to lift and lower the card collection cassette (see, for example, Chinese Patent Laid-Open No. 103544768). In the card collecting and processing apparatus described in the Patent Literature, the card collection cassette is provided with a plurality of card loading slots which are disposed so as to superpose on each other in an upper and lower direction, and one card can be stored in one card loading slot. Each of the card loading slots is provided with a card pushing-out mechanism structured to push out a stored card toward a card reader. The lifting mechanism includes a nut which is attached to the card collection cassette, a screw with which the nut is engaged, a motor for rotating the screw, and a guide mechanism structured to guide the card collection cassette in an upper and lower direction. The guide mechanism includes a guide shaft which is disposed so that the upper and lower direction and its axial direction are coincided with each other, and a guide bush engaged with the guide shaft. The guide bush is attached to the card collection cassette. Further, the card collecting and processing apparatus includes a pair of card conveying rollers which are disposed between the card reader and the card collection cassette.

In the card collecting and processing apparatus described in the Patent Literature, when processing by a customer is not executed during a predetermined time period in a state that a card has been taken into the card reader, it is judged that the customer has forgotten to take out the card and thus, the card in a card conveying passage of the card reader is taken into a card loading slot of the card collection cassette and stored. In this case, the lifting mechanism moves the card collection cassette up or down so that the heights of the card conveying passage and the card loading slot in which the card is to be stored are coincided with each other. Further, in this case, the card ejected from the card reader is conveyed by a pair of the card conveying rollers and is taken into the card loading slot. Further, in the card collecting and processing apparatus, when a predetermined processing by a customer is executed before a predetermined time period has elapsed after the card is stored in the card loading slot, the card stored in the card loading slot is pushed out toward the card conveying passage by the card pushing-out mechanism and the card is returned to the customer through the card reader.

In the card collecting and processing apparatus described in the Patent Literature, the lifting mechanism moves a card collection cassette up and down by using a screw and a nut and is provided with a guide mechanism structured of a guide shaft and a guide bush. When a length in an upper and lower direction of the guide bush engaged with the guide shaft becomes shorter, inclination of the guide bush becomes larger with respect to an axial direction of the guide shaft and thus the guide bush does not move smoothly along the guide shaft and, as a result, the card collection cassette may be hard to move smoothly. Therefore, in the card collecting and processing apparatus described in the Patent Literature, the length in the upper and lower direction of the guide bush is required to make longer. However, in the card collecting and processing apparatus described in the Patent Literature, when a length in the upper and lower direction of the guide bush becomes longer, the guide shaft also becomes longer corresponding to a length of the guide bush and thus a length in the upper and lower direction of the lifting mechanism becomes longer and, as a result, the size of the card collecting and processing apparatus is increased in the upper and lower direction.

Further, in the card collecting and processing apparatus described in the Patent Literature, the card collection cassette is sometimes moved up and down in a state that a card is stored in a card loading slot. In a case that a card which is stored in a card loading slot is not completely taken into the card loading slot, when the card collection cassette is to be moved up and down, the card stored in the card loading slot and a structural component of the card collecting and processing apparatus may be interfered with each other. However, in the card collecting and processing apparatus described in the Patent Literature, a card ejected from the card reader is taken into the card loading slot by a pair of the card conveying rollers disposed between the card reader and the card collection cassette and thus an incomplete taken-in operation of a card to a card loading slot may be occurred. Therefore, in the card collecting and processing apparatus, when the card collection cassette is moved up and down, a card stored in a card loading slot and the structural component of the card collecting and processing apparatus may be interfered with each other.

In addition, in the card collecting and processing apparatus described in the Patent Literature, each of the card loading slots is provided with a card pushing-out mechanism structured to push out a stored card toward the card reader. Therefore, the number of components of a card pushing-out mechanism is increased and the structure of the card pushing-out mechanism is complicated.

SUMMARY

In view of the problem described above, at least a first embodiment of the present invention may advantageously provide a card storage and ejection module structured to perform a card storing operation for storing a card ejected from a card reader and a card ejecting operation for ejecting a stored card toward the card reader, a size in an upper and lower direction of the card storage and ejection module being capable of reducing even when a card storage cassette having a plurality of card storage parts in which one card is stored can be smoothly lifted and lowered.

In view of the problem described above, at least a second embodiment of the present invention may advantageously provide a card storage and ejection module structured to perform a card storing operation for storing a card ejected from a card reader and a card ejecting operation for ejecting a stored card toward the card reader, the card storage and ejection module being capable of preventing interference of a card stored in a card storage part with a structural component of the card storage and ejection module when a card storage cassette having a plurality of card storage parts in which one card is stored is lifted and lowered.

In view of the problem described above, at least a third embodiment of the present invention may advantageously provide a card storage and ejection module structured to perform a card storing operation for storing a card ejected from a card reader and a card ejecting operation for ejecting a stored card toward the card reader, in which a structure of a card pushing-out mechanism for pushing out a card stored in a card storage part toward a card conveying passage of the card reader can be simplified.

According to at least a first embodiment of the present invention, there may be provided a card storage and ejection module structured to perform a card storing operation for storing a card ejected from a card reader and a card ejecting operation for ejecting a stored card toward the card reader. The card storage and ejection module includes a card storage cassette having a plurality of card storage parts each of which stores one card, a lifting mechanism structured to lift and lower the card storage cassette, and a support frame which supports the card storage cassette so that the card storage cassette is capable of being lifted and lowered. A plurality of the card storage parts is disposed so as to be overlapped with each other in an upper and lower direction, and the lifting mechanism includes a parallel link mechanism having at least two link arms which connect the support frame with the card storage cassette and are disposed in an aligned state in a horizontal direction so as to be parallel to each other for lifting and lowering the card storage cassette in a state that a horizontal posture of the card storage cassette is maintained.

In the card storage and ejection module in accordance with at least an embodiment of the present invention, the lifting mechanism for lifting and lowering the card storage cassette includes a parallel link mechanism for lifting and lowering the card storage cassette in a state that a horizontal posture of the card storage cassette is maintained. Therefore, according to at least an embodiment of the present invention, a smooth lifting and lowering operation of the card storage cassette can be performed by using the parallel link mechanism. Further, in at least an embodiment of the present invention, at least two link arms structuring the parallel link mechanism are disposed in an aligned state in a horizontal direction so as to be parallel to each other. Therefore, in comparison with a case that a guide shaft and a guide bush are provided like the card collecting and processing apparatus described in the above-mentioned Patent Literature, a length in the upper and lower direction of the lifting mechanism can be shortened. Accordingly, in at least an embodiment of the present invention, a smooth lifting and lowering operation of the card storage cassette can be performed and, in addition, the size in the upper and lower direction of the card storage and ejection module can be reduced.

In at least an embodiment of the present invention, the parallel link mechanism is comprised of the two link arms, the lifting mechanism includes a motor and a gear train for transmitting power of the motor to the two link arms, one end side of the link arm is turnably connected with the support frame, the other end side of the link arm is turnably connected with the card storage cassette, and the two link arms are turned in a synchronized manner by the power of the motor with the one end sides of the two link arms as turning centers. According to this structure, when the card storage cassette is to be lifted and lowered by the lifting mechanism, the card storage cassette can be lifted and lowered under a state that a horizontal posture of the card storage cassette is surely maintained. In this case, it may be structured that a plurality of the card storage parts is displaced from each other in a direction perpendicular to a card conveying direction so as to correspond to a lifting and lowering operation by the parallel link mechanism.

In at least an embodiment of the present invention, the card storage and ejection module includes a card detection mechanism structured to detect that a card is stored in the card storage part. The card detection mechanism includes a plurality of detection levers each of which is turnably attached to each of a plurality of the card storage parts, each of the detection levers being turned when the card is stored in the card storage part, and one sensor which is attached to the support frame. It is detected whether the card is stored in the card storage part or not on the basis of that the detection lever attached to the card storage part which is disposed at a position coincided with a card conveying passage of the card reader in the upper and lower direction is detected by the sensor or not. According to this structure, a sensor is not provided in the card storage cassette and thus wiring lines for a sensor are not required to be connected with the card storage cassette which is performed with a lifting and lowering operation. Therefore, leading-out of wiring lines for a sensor is easy when the card storage and ejection module is to be assembled. Further, disconnection of wiring lines for a sensor is hard to be occurred.

According to at least a second embodiment of the present invention, there may be provided a card storage and ejection module structured to perform a card storing operation for storing a card ejected from a card reader and a card ejecting operation for ejecting a stored card toward the card reader. The card storage and ejection module includes a card storage cassette having a plurality of card storage parts each of which stores one card, a lifting mechanism structured to lift and lower the card storage cassette, a support frame which supports the card storage cassette so that the card storage cassette is capable of being lifted and lowered, and an impeller structured to feed the card ejected from the card reader into the card storage part. A plurality of the card storage parts is disposed so as to be overlapped with each other in an upper and lower direction, and the impeller includes a rotor body and a plurality of blades which are formed of an elastic member and are formed so as to extend from an outer peripheral face of the rotor body to an outer peripheral side of the rotor body for feeding the card into the card storage part by contacting with the card.

In at least an embodiment of the present invention, the card storage and ejection module includes, for example, a conveying roller which is disposed between the card reader and the card storage cassette and is structured to convey the card, and the conveying roller and the impeller are coaxially disposed each other. In this case, for example, it may be structured that turning shafts of the two link arms are provided so as to be perpendicular to a shaft on which the conveying roller and the impeller are disposed. According to this structure, a plurality of the card storage parts can be lifted and lowered under a state that their horizontal postures are surely maintained and a card storing operation and a card ejecting operation can be performed appropriately.

The card storage and ejection module in accordance with at least an embodiment of the present invention includes an impeller structured to feed the card ejected from the card reader into the card storage part, and the impeller includes a rotor body and a plurality of blades which are formed of an elastic member and are formed so as to extend from an outer peripheral face of the rotor body to an outer peripheral side of the rotor body for feeding the card into the card storage part by contacting with the card. Therefore, according to at least an embodiment of the present invention, for example, even when a card which is to be stored in the card storage part is not completely fed into the card storage part by the conveying roller, the card to be stored in the card storage part can be completely fed into the card storage part by the blades. In other words, a card which is to be stored in the card storage part can be completely taken into the card storage part by utilizing the blades of the impeller. Therefore, according to at least an embodiment of the present invention, interference of a card stored in the card storage part with a structural component of the card storage and ejection module can be prevented when the card storage cassette is lifted or lowered.

In at least an embodiment of the present invention, for example, a plurality of the blades is formed so as to extend from an outer peripheral face of the rotor body to an outer peripheral side of the rotor body in a radial shape or a spiral shape.

In at least an embodiment of the present invention, the card storage and ejection module includes a card pushing-out mechanism structured to push out a card from the card storage part toward the card conveying passage of the card reader, a conveying roller which is disposed between the card reader and the card storage cassette for conveying the card, a motor structured to drive the conveying roller, and a power transmission mechanism structured to transmit power of the motor to the conveying roller. The motor is connected with the impeller through the power transmission mechanism and, when a rotating direction of the impeller for feeding the card into the card storage part is referred to as a first rotating direction, the power transmission mechanism includes a one-way clutch which transmits power of the motor in the first rotating direction to the impeller. According to this structure, the conveying roller and the impeller are driven by a common motor and thus a structure of the card storage and ejection module can be simplified. Further, according to this structure, when a stored card is to be ejected, an operation can be prevented by the one-way clutch that another card is pulled out from its card storage part by the blade of the impeller due to a rotating force of the rotation shaft.

According to at least a third embodiment of the present invention, there may be provided a card storage and ejection module structured to perform a card storing operation for storing a card ejected from a card reader and a card ejecting operation for ejecting a stored card toward the card reader. The card storage and ejection module includes a card storage cassette having a plurality of card storage parts each of which stores one card, a lifting mechanism structured to lift and lower the card storage cassette, a support frame which supports the card storage cassette so that the card storage cassette is capable of being lifted and lowered, and a card pushing-out mechanism structured to push out a card from the card storage part toward the card conveying passage of the card reader. A plurality of the card storage parts is disposed so as to be overlapped with each other in an upper and lower direction, and the card pushing-out mechanism includes one pushing lever which is turnably held by the support frame and is structured to contact with the card and push out the card toward the card conveying passage, and a drive source which is attached to the support frame and is structured to turn the pushing lever.

In the card storage and ejection module in at least an embodiment of the present invention, a card pushing-out mechanism structured to push out a card from the card storage part toward the card conveying passage of the card reader includes one pushing lever which is turnably held by the support frame and is structured to contact with the card and push out the card toward the card conveying passage, and a drive source which is attached to the support frame and is structured to turn the pushing lever. Therefore, according to at least an embodiment of the present invention, cards stored in a plurality of the card storage parts can be pushed out toward the card conveying passage of the card reader by a common pushing lever and a common drive source. Specifically, it may be structured that the pushing lever is disposed at a position coincided with the card conveying passage of the card reader in the upper and lower direction and, when the drive source is not driven, the pushing lever is retreated from the card storage cassette and, when the drive source is driven, the pushing lever pushes out the card stored in the card storage part located at a height coincided with the card conveying passage of the card reader. Therefore, according to at least an embodiment of the present invention, in comparison with a case that each of a plurality of the card storage parts is provided with a mechanism for pushing out a card like the card collecting and processing apparatus described in the above-mentioned Patent Literature, a structure of the card pushing-out mechanism can be simplified.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 9A and 9B are explanatory views showing an elevating and lowering operation of the card storage cassette shown in FIG. 2.

DETAILED DESCRIPTION OF THE PREFERRED EMBODIMENTS

An embodiment of the present invention will be described below with reference to the accompanying drawings.

(Schematic Structure of Card Processing Apparatus)

Figure 1:
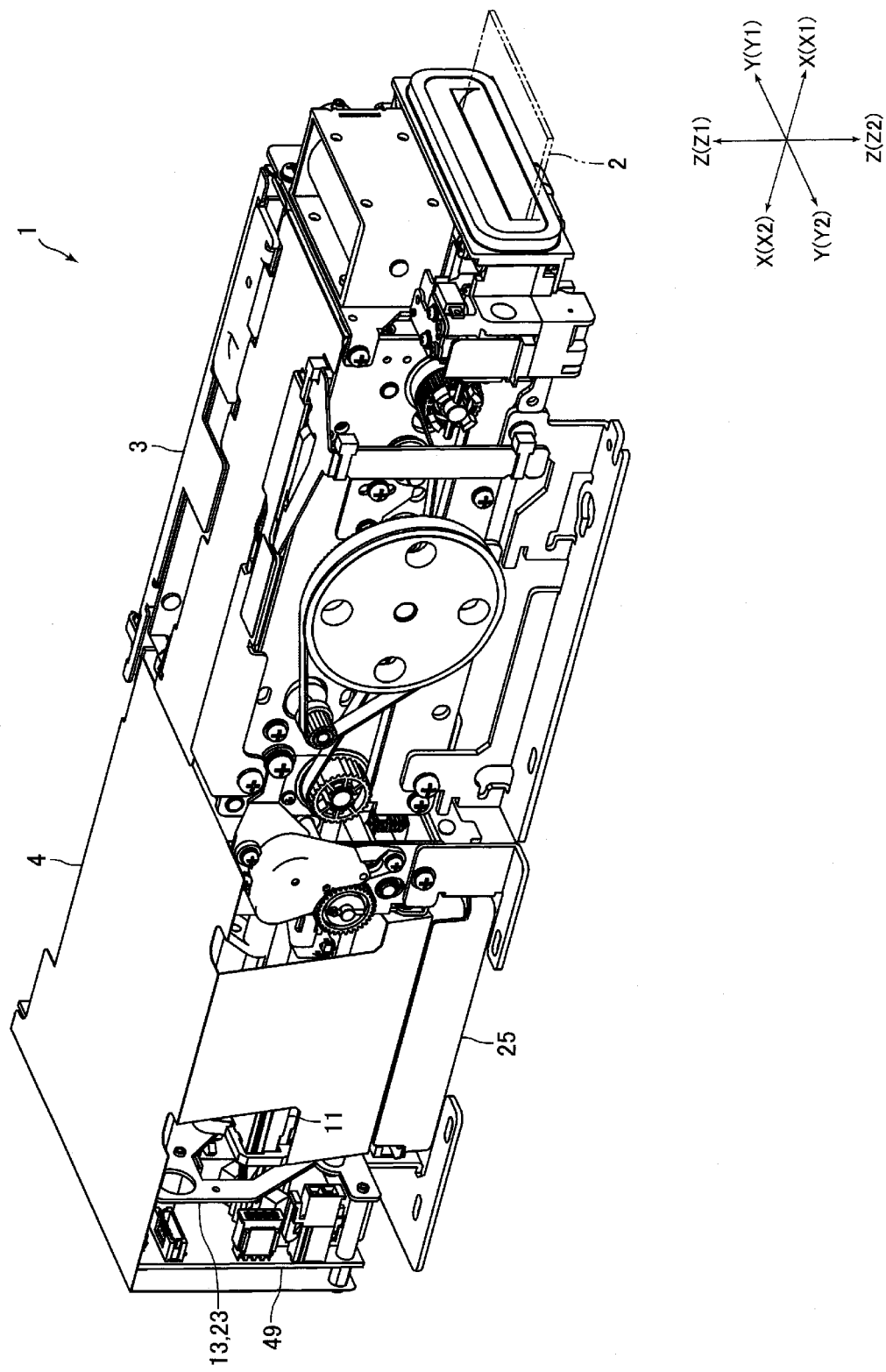
FIG. 1 is a perspective view showing a card processing apparatus in accordance with an embodiment of the present invention.

FIG. 1 is a perspective view showing a card processing apparatus in accordance with an embodiment of the present invention. A card processing apparatus 1 in this embodiment includes a card reader 3 structured to read data recorded in a card 2 and record data to the card 2 and a card storage and ejection module 4 structured to perform a card storing operation for storing a card 2 ejected from the card reader 3 and a card ejecting operation for ejecting a stored card 2 toward the card reader 3. The card processing apparatus 1 is mounted on a host equipment such as an ATM (Automated Teller Machine) for use.

A card 2 is, for example, a rectangular card made of vinyl chloride whose thickness is about 0.7-0.8 mm. The card 2 is, for example, formed with a magnetic stripe in which magnetic data are recorded. Further, for example, an IC chip is incorporated in the card 2. In accordance with an embodiment of the present invention, the card 2 may be a PET (polyethylene terephthalate) card whose thickness is about 0.18-0.36 mm or may be a paper card having a predetermined thickness.

In the following descriptions, as shown in FIG. 1, three directions perpendicular to each other are set to be an "X" direction, a "Y" direction and a "Z" direction, and the "X" direction is referred to as a front and rear direction, the "Y" direction is referred to as a right and left direction, and the "Z" direction is an upper and lower direction. Further, an "X1" direction side is referred to as a "front" side, an "X2" direction side is referred to as a "rear" side, a "Y1" direction side is a "right" side, a "Y2" direction side is a "left" side, a "Z1" direction side is an "upper" side, and a "Z2" direction side is a "lower" side. In this embodiment, the "X" direction is a conveying direction of a card 2 which is conveyed in an inside of the card processing apparatus 1 and is a length direction (longitudinal width direction) of the card 2 which is taken into the card processing apparatus 1. Further, the "X1" direction is an ejecting direction of a card 2 from the card processing apparatus 1 and the "X2" direction is an inserting direction of a card 2 into the card processing apparatus 1. Further, the "Z" direction is a thickness direction of a card 2 which is taken into the card processing apparatus 1, and the "Y" direction is a width direction (short widthwise direction) of the card 2 which is taken into the card processing apparatus 1.

The card reader 3 is connected with an front end of a card storage and ejection module 4. The card reader 3 is, for example, provided with a magnetic head (not shown) and an IC contact block (not shown). An inside of the card reader 3 is formed with a card conveying passage 6 (see FIG. 7) through which a card 2 is conveyed. Further, the card reader 3 includes a card conveying mechanism structured to convey a card 2. The card conveying mechanism includes a conveying roller 7 (see FIG. 7) and a pad roller 8 (see FIG. 7) which are disposed so as to face the card conveying passage 6.

The card storage and ejection module 4 is structured to store a card 2 ejected from a rear end of the card conveying passage 6 and to eject a stored card 2 toward the rear end of the card conveying passage 6. A specific structure of the card storage and ejection module 4 will be described below.

(Structure of Card Storage and Ejection Module)

Figure 2:
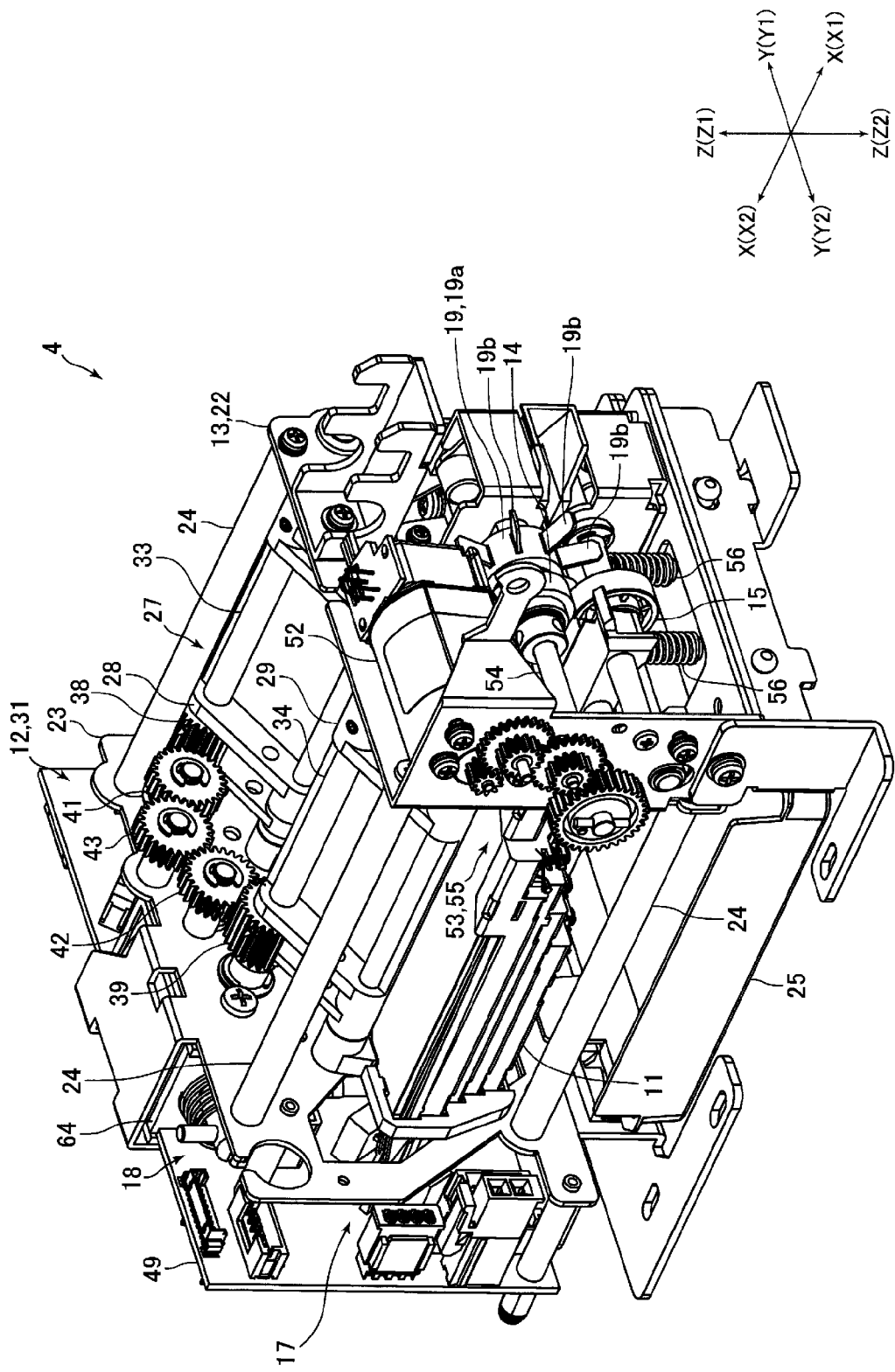
FIG. 2 is a perspective view showing a card storage and ejection module shown in FIG. 1.
Figure 3:
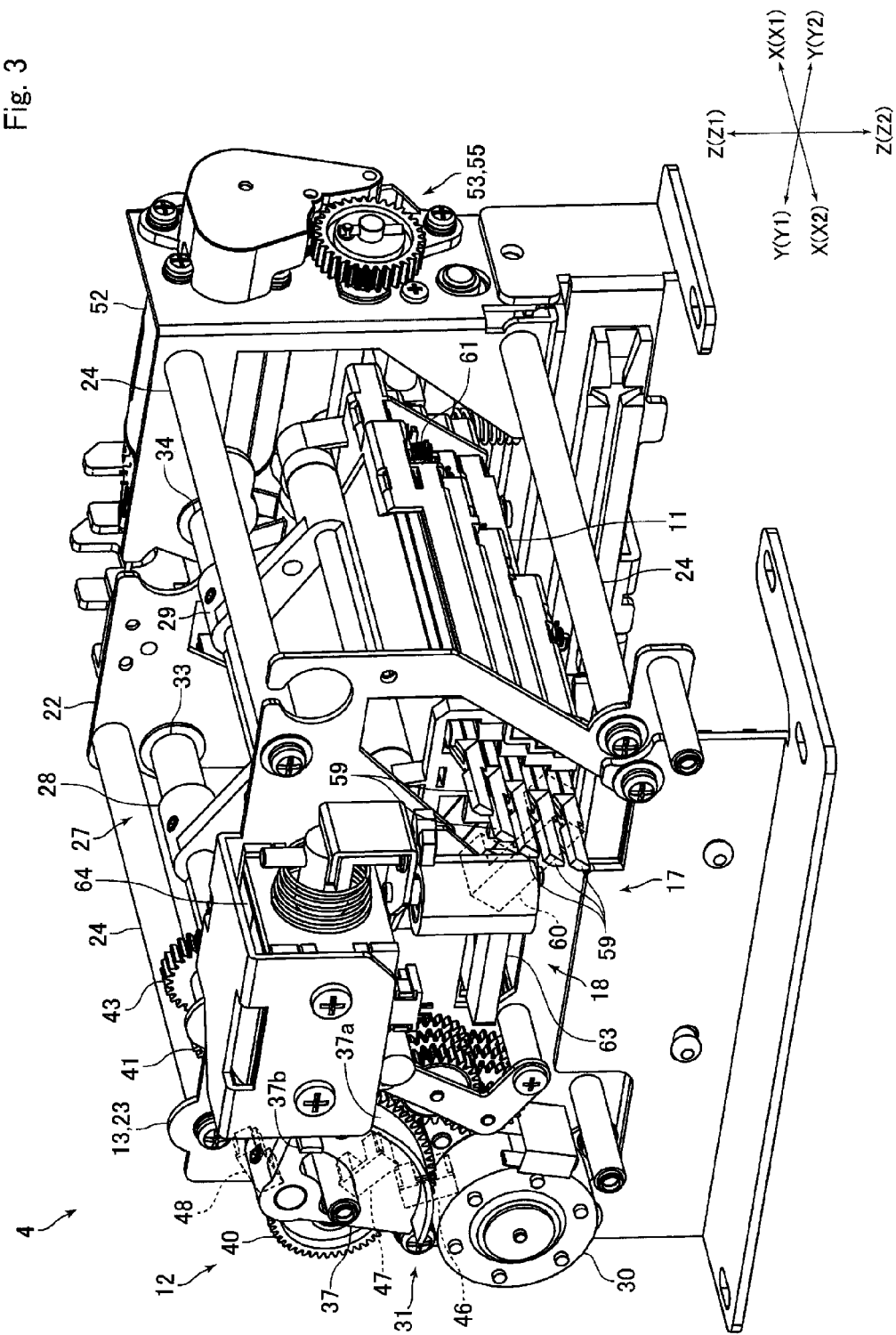
FIG. 3 is a perspective view showing the card storage and ejection module shown in FIG. 2 which is viewed from another angle.
Figure 4:
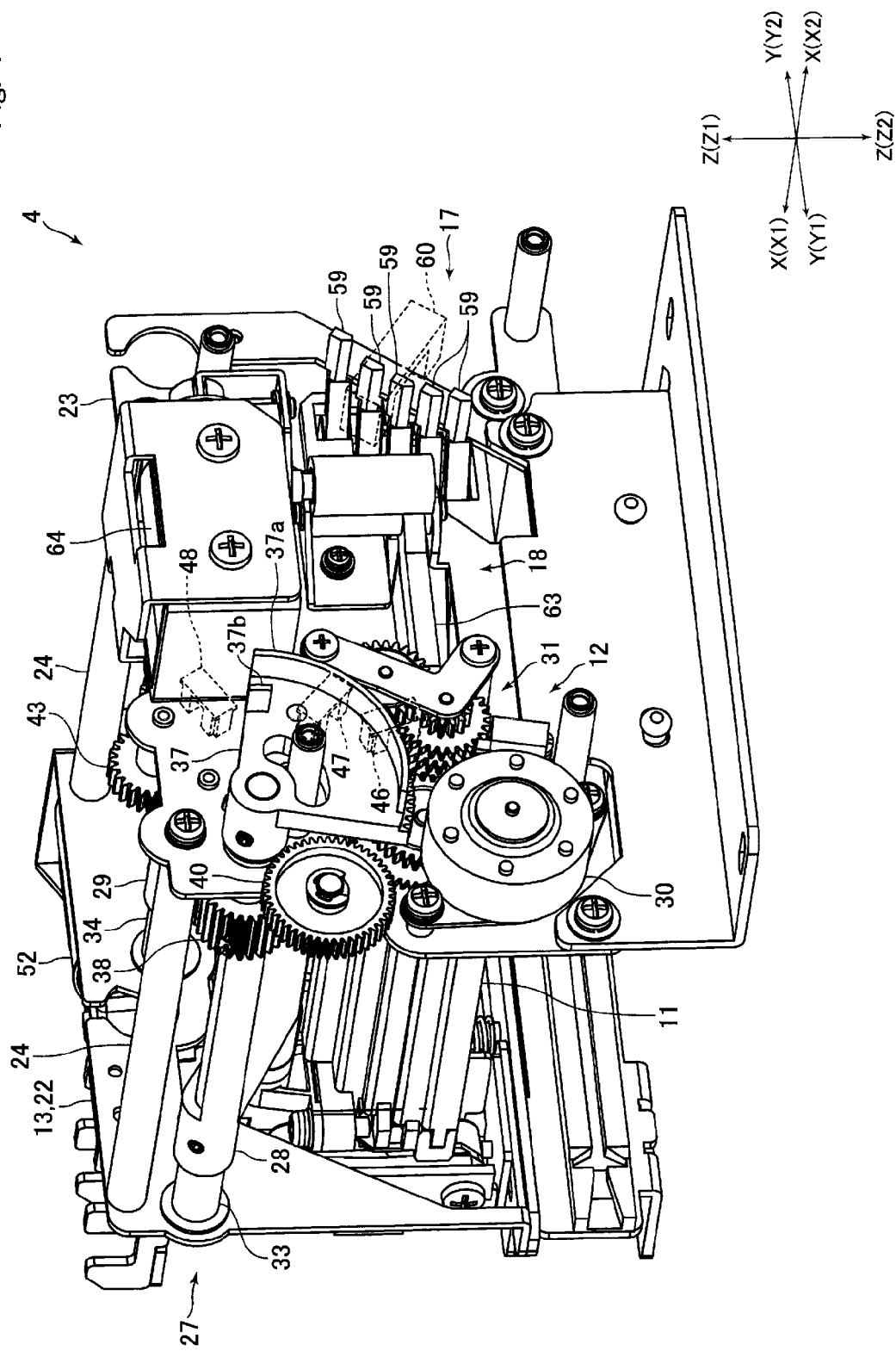
FIG. 4 is a perspective view showing the card storage and ejection module shown in FIG. 3 which is viewed from another angle.
Figure 5:
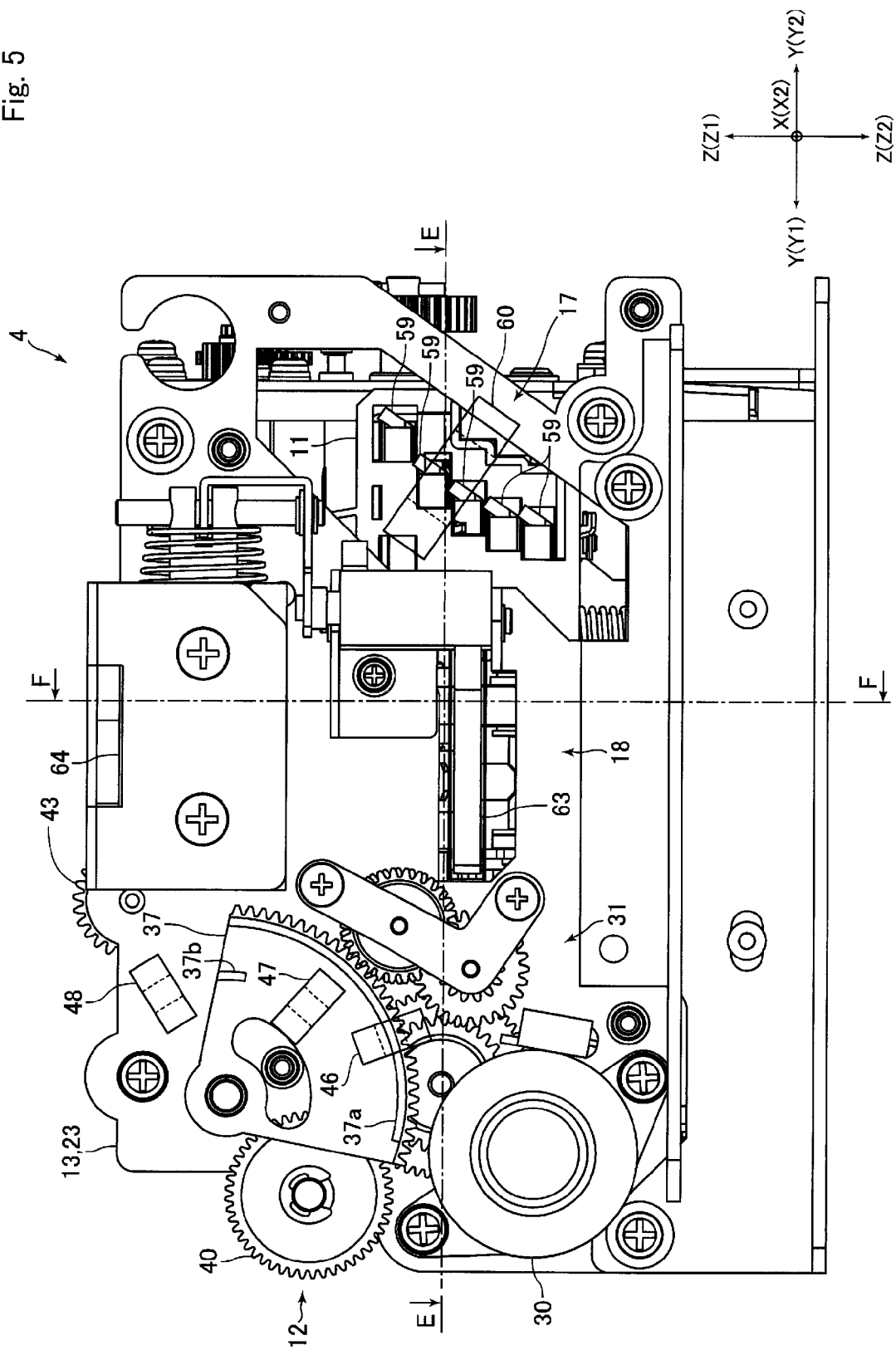
FIG. 5 is a rear view showing the card storage and ejection module shown in FIG. 2.
Figure 6:
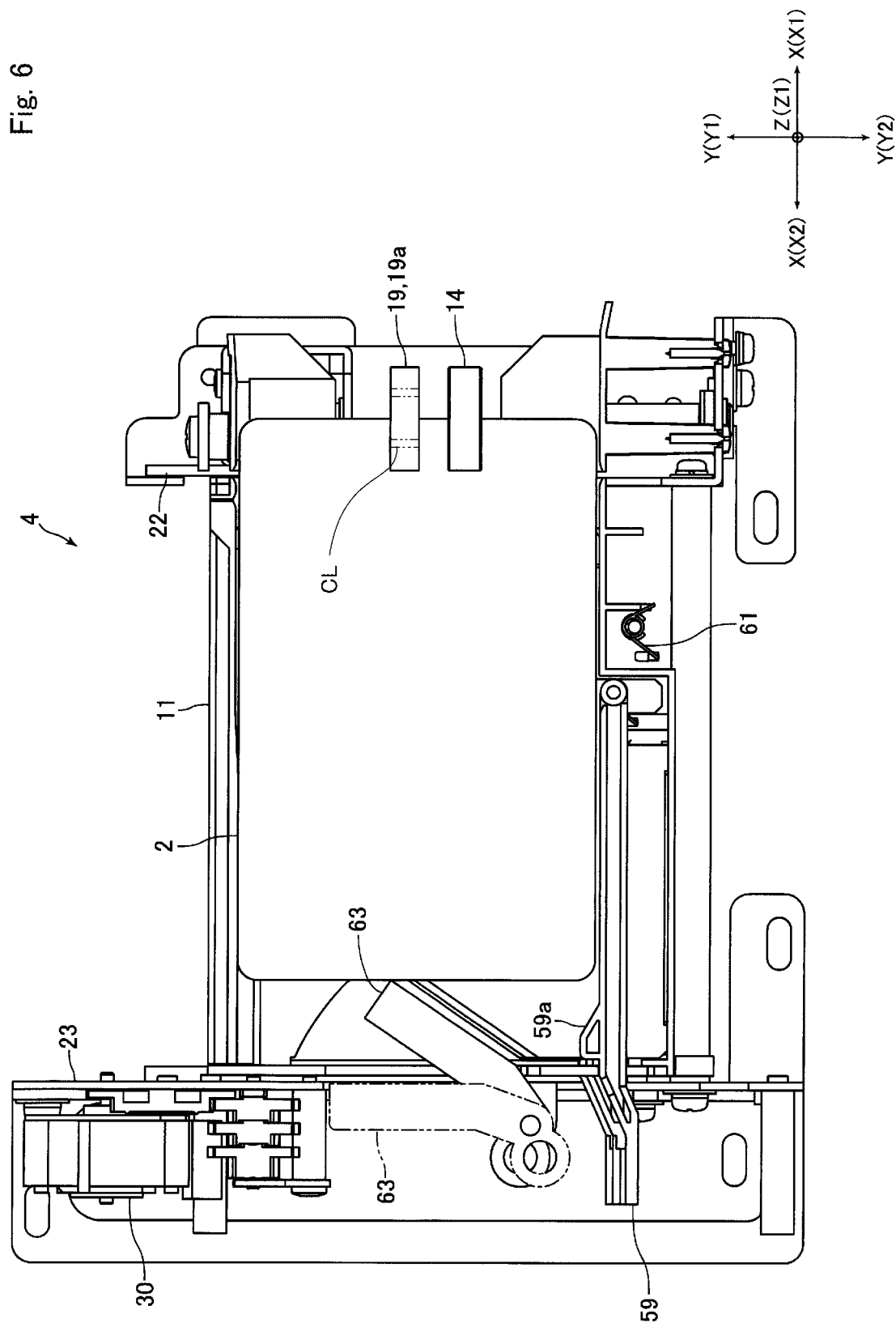
FIG. 6 is a schematic cross-sectional view showing the "E-E" cross section in FIG. 5.
Figure 7:
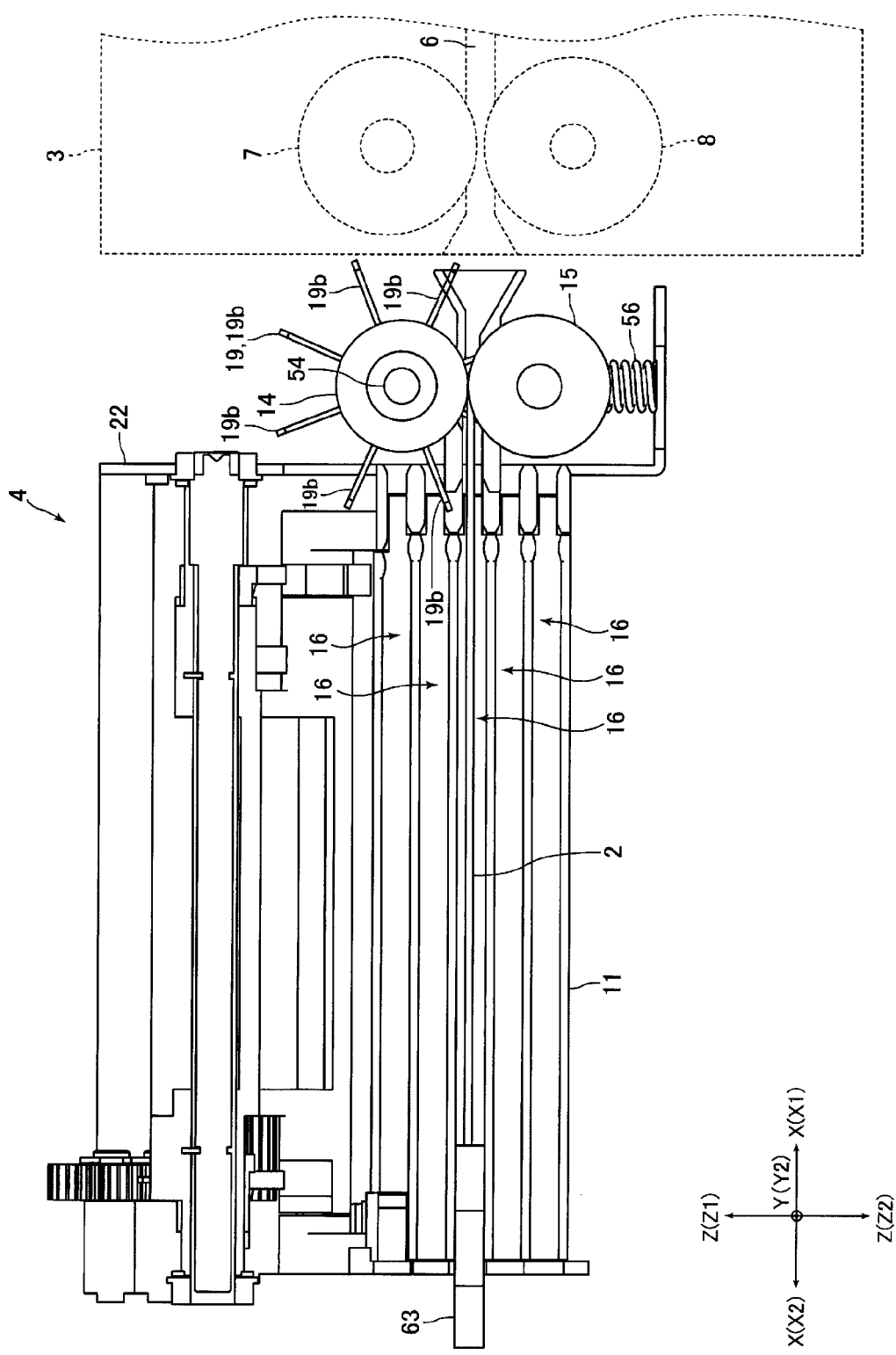
FIG. 7 is a schematic cross-sectional view showing the "F-F" cross section in FIG. 5.
Figure 8:
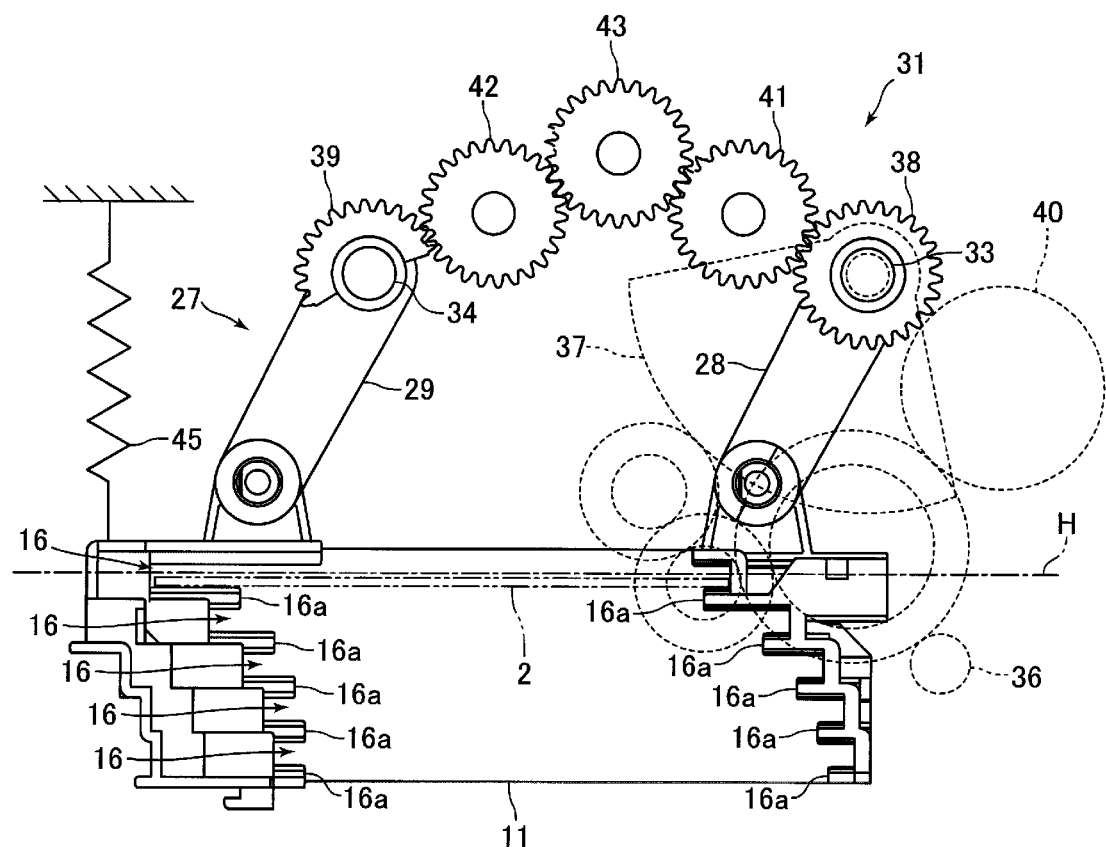
FIG. 8 is an explanatory schematic front view showing a structure of a card storage cassette and a lifting mechanism shown in FIG. 2.
Figure 10A:
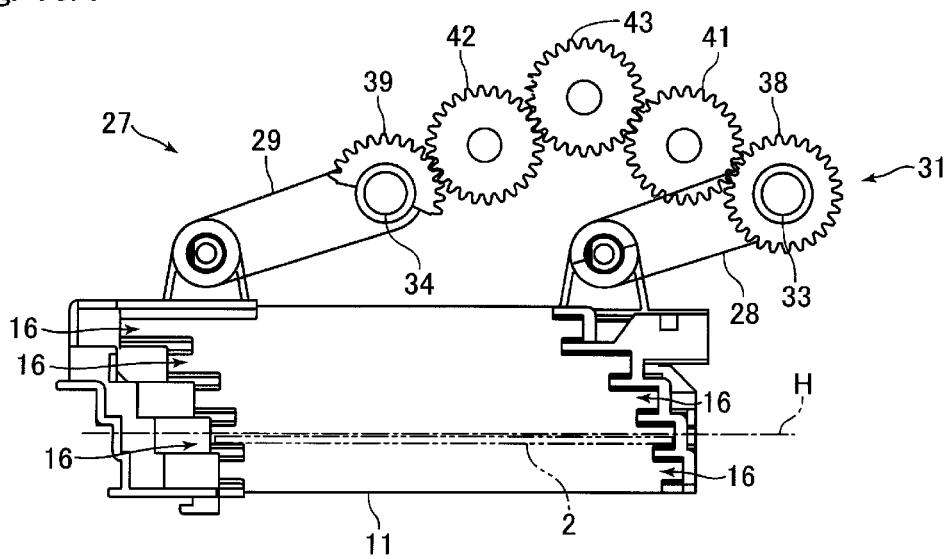
FIGS. 10A, 10B and 10C are explanatory views showing an elevating and lowering operation of the card storage cassette shown in FIG. 2.
Figure 10B:
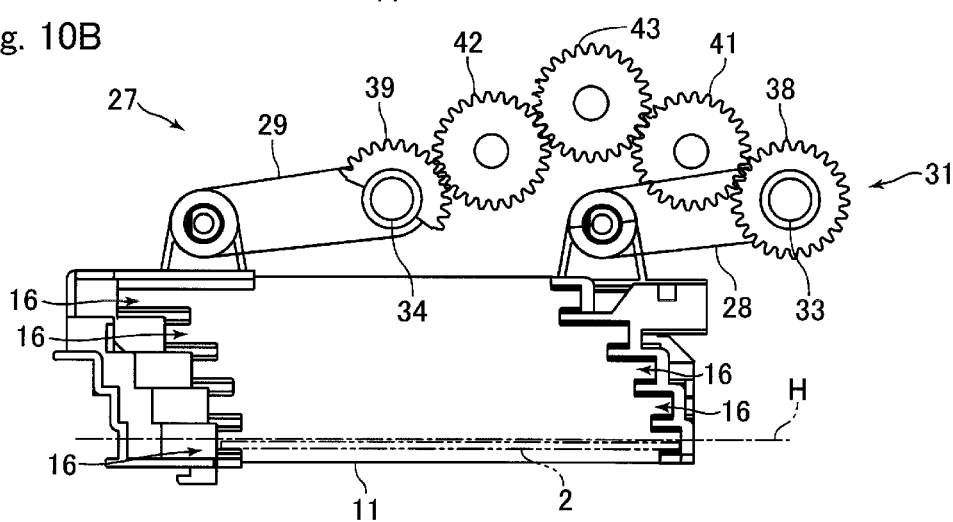
Figure 10C:
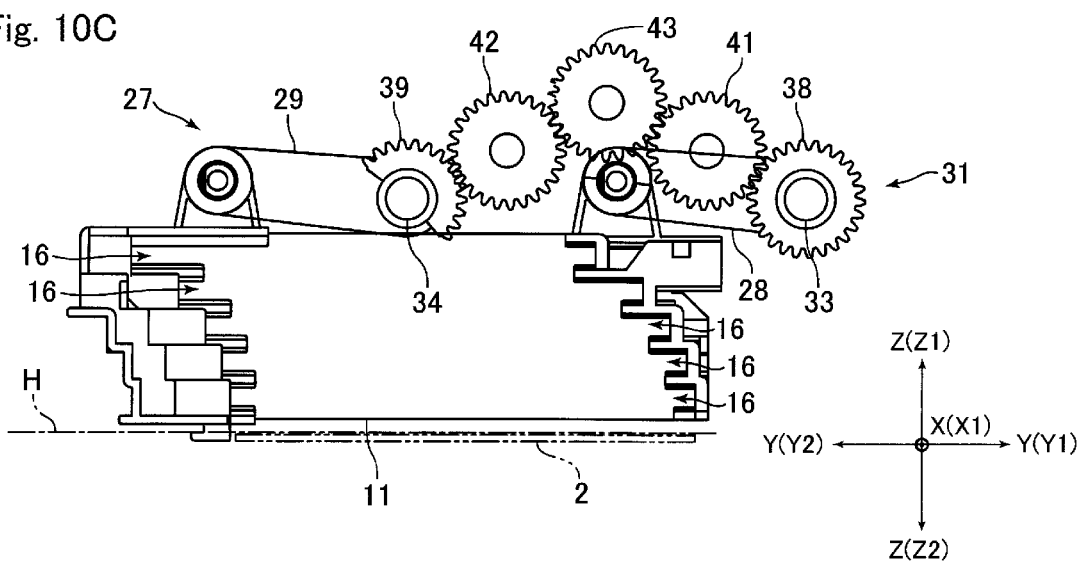

FIG. 2 is a perspective view showing the card storage and ejection module 4 shown in FIG. 1. FIG. 3 is a perspective view showing the card storage and ejection module 4 shown in FIG. 2 which is viewed from another angle. FIG. 4 is a perspective view showing the card storage and ejection module 4 shown in FIG. 3 which is viewed from another angle. FIG. 5 is a rear view showing the card storage and ejection module 4 shown in FIG. 2. FIG. 6 is a schematic cross-sectional view showing the "E-E" cross section in FIG. 5. FIG. 7 is a schematic cross-sectional view showing the "F-F" cross section in FIG. 5. FIG. 8 is an explanatory schematic front view showing a structure of a card storage cassette 11 and a lifting mechanism 12 shown in FIG. 2. FIGS. 9A and 9B and FIGS. 10A, 10B and 10C are explanatory views showing an elevating and lowering operation of the card storage cassette 11 shown in FIG. 2.

The card storage and ejection module 4 includes a card storage cassette 11 capable of storing a plurality of cards 2, a lifting mechanism 12 structured to elevate and lower the card storage cassette 11, a support frame 13 which supports the card storage cassette 11 so as to be capable of elevating and lowering the card storage cassette 11, and a conveying roller 14 and a pad roller 15 which are disposed between the card reader 3 and the card storage cassette 11 in the front and rear direction and are structured to convey a card 2.

The card storage cassette 11 is formed in a substantially rectangular parallelepiped shape. The card storage cassette 11 is provided with a plurality of card storage parts 16 each of which stores one card 2 as shown in FIG. 8. One card 2 is capable of being stored in each of the card storage parts 16. The card storage cassette 11 in this embodiment is provided with five card storage parts 16 and thus the card storage cassette 11 is capable of storing five cards 2. Further, the card storage and ejection module 4 includes a card detection mechanism 17 structured to detect that a card 2 has been stored in the card storage part 16, a card pushing-out mechanism 18 structured to push out a card 2 from the card storage part 16 toward the card conveying passage 6 of the card reader 3, and an impeller 19 structured to feed a card 2 ejected from the card reader 3 into the card storage part 16. The number of the card storage parts 16 provided in the card storage cassette 11 may be two (2) through four (4) or may be six (6) or more.

The support frame 13 includes two frame plates 22 and 23 which are disposed with a predetermined distance between them in the front and rear direction, i.e., in a card conveying direction and a plurality of connecting shafts 24 which connect the frame plate 22 with the frame plate 23. The frame plate 22 is disposed on a front side and the frame plate 23 is disposed on a rear side. The connecting shaft 24 is fixed to the frame plates 22 and 23 so that its shaft direction and the front and rear direction are coincided with each other. The card storage cassette 11 is disposed between the frame plate 22 and the frame plate 23 so as to be capable of performing a lifting and lowering operation in which the card storage cassette 11 is moved up and down in the upper and lower direction while moving in the right and left direction. A card storage box 25 for storing a card 2 is disposed to a lower side of the card storage cassette 11. The card storage box 25 is formed in a substantially rectangular parallelepiped box shape whose upper face is opened. The card storage box 25 is fixed to the frame plates 22 and 23. The card storage box 25 is not shown in FIGS. 3 and 4.

Five card storage parts 16 are disposed so as to overlap with each other in the upper and lower direction. The card storage part 16 in this embodiment is, as shown in FIG. 8, structured of support parts 16*a* which support both end side portions in the right and left direction of a card 2 from a lower side. A space is provided at a center in the right and left direction of the card storage cassette 11. Further, both ends in the front and rear direction (both ends in the card conveying direction) of the card storage part 16 are not closed and opened. The card storage cassette 11 in this embodiment is, as described below, moved in the right and left direction when the card storage cassette 11 is elevated and lowered. Five card storage parts 16 are displaced from each other in the right and left direction so that, when each of five card storage parts 16 is moved to the same position as the card conveying passage 6 in the upper and lower direction, each position of five card storage parts 16 and the position of the card conveying passage 6 are coincided with each other in the right and left direction. In other words, five card storage parts 16 are respectively disposed so as to be displaced in a direction perpendicular to a conveying direction of a card so that each of five card storage parts 16 is located at a position corresponding to the card conveying passage 6 where the card is capable of being stored from and fed out to the card conveying passage 6 when a lifting and lowering operation is performed while moving in the right and left direction by the lifting mechanism 12. Specifically, as shown in FIG. 8, the positions of five card storage parts 16 are displaced to the right side toward a lower side so as to correspond to a lifting and lowering operation.

The lifting mechanism 12 includes a parallel link mechanism 27 structured to elevate and lower the card storage cassette 11 in a state that a horizontal attitude of the card storage cassette 11 is maintained. The parallel link mechanism 27 includes two (a pair) link arms 28 and 29 which connect the card storage cassette 11 with the support frame 13. Further, the lifting mechanism 12 includes a motor 30 which is a drive source and a gear train 31 through which power of the motor 30 is transmitted to two link arms 28 and 29. The link arm 28 and the link arm 29 are formed in the same shape as each other. Two link arms 28 and 29 are disposed in an aligned state in the right and left direction so as to be parallel to each other. In this embodiment, the link arm 28 is disposed on the right side and the link arm 29 is disposed on the left side.

One end sides of the link arms 28 and 29 are turnably connected with the support frame 13. Specifically, the one end side of the link arm 28 is fixed to a turning shaft 33 which is turnably supported by upper end sides of the frame plates 22 and 23. The one end side of the link arm 28 is turnably connected with the support frame 13 through the turning shaft 33. Similarly, one end side of the link arm 29 is fixed to a turning shaft 34 which is turnably supported by upper end sides of the frame plates 22 and 23. The one end side of the link arm 29 is turnably connected with the support frame 13 through the turning shaft 34. The turning shafts 33 and 34 are disposed so that their shaft directions and the front and rear direction are coincided with each other. In other words, axial directions of the turning shafts 33 and 34 are disposed in a direction perpendicular to the rotation shaft 54 to which a conveying roller 14 described below is fixed. The other end sides of the link arms 28 and 29 are turnably connected with the card storage cassette 11. Specifically, the other end sides of the link arms 28 and 29 are turnably connected with upper end sides of the card storage cassette 11.

For example, the motor 30 is a stepping motor. The motor 30 is fixed to a rear face of the frame plate 23. The gear train 31 includes a gear 36 (see FIG. 8) fixed to an output shaft of the motor 30, a fan type gear (sector gear) 37 fixed to the turning shaft 33, a gear 38 fixed to the turning shaft 33, and a gear 39 fixed to the turning shaft 34. The gear 36 and the fan type gear 37 are disposed on a rear side of the frame plate 23. The gear 36 and the fan type gear 37 are connected with each other through a plurality of gears rotatably held by the frame plate 23. One gear among the plurality of the gears is engaged with a manually rotatable gear 40 for rotating the respective gears structuring the gear train 31 by hand. The gears 38 and 39 are disposed on a front side of the frame plate 23. The gear 38 and the gear 39 are connected with each other through a gear 41 engaged with the gear 38, a gear 42 engaged with the gear 39, and a gear 43 engaged with the gear 41 and the gear 42. In other words, the link arm 28 whose one end side is fixed to the turning shaft 33 and the link arm 29 whose one end side is fixed to the turning shaft 34 are connected with each other through the gears 38, 39, 41 through 43. The gears 41 through 43 are rotatably held by the frame plate 23.

Pitch circle diameters of the gears 38, 39, 41 through 43 are set to be equal to each other. Therefore, the link arm 28 whose one end side is fixed to the turning shaft 33 and the link arm 29 whose one end side is fixed to the turning shaft 34 are turned by power of the motor 30 in a synchronized manner with the one end sides of the link arms 28 and 29 as turning centers. In other words, the link arm 28 and the link arm 29 are simultaneously turned by the same angle by power of the motor 30 with the one end sides of the link arms 28 and 29 as turning centers. Further, as described above, the link arm 28 and the link arm 29 are formed in the same shape as each other and are disposed in a horizontally aligned state so as to be parallel to each other.

Therefore, the card storage cassette 11 is moved up and down while moving in the right and left direction (lifting and lowering operation is performed) in a state that its horizontal attitude is maintained. Further, the card storage cassette 11 is elevated at least from a state (state shown in FIG. 8) that a height of the card storage part 16 disposed at an uppermost position is coincided with a height "H" of the card conveying passage 6 to a state (a state shown in FIG. 10C) that a height of the card storage part 16 disposed at the lowest position is set higher than the height "H" of the card conveying passage 6.

In this embodiment, in order to prevent rattling of the card storage cassette 11 due to a backlash of the gear train 31, the card storage cassette 11 is urged in a predetermined direction by an urging member 45 (see FIG. 8). For example, the urging member 45 is a tension coil spring whose one end is attached to an upper end side of the support frame 13 and its other end is attached to an upper end side of the card storage cassette 11 and a left end side of the card storage cassette 11 is urged toward an upper direction.

A rear face of the fan type gear 37 is formed with two detection pieces 37*a* and 37*b* for detecting a position of the card storage cassette 11 in the upper and lower direction (see FIG. 5). Shapes of the detection pieces 37*a* and 37*b* when viewed in the front and rear direction are formed in a curved plate shape which is a circular arc shape with the axial center of the turning shaft 33 is the center of curvature. Further, the detection pieces 37*a* and 37*b* are formed so as to be protruded from a rear face of the fan type gear 37 to a rear side. The detection piece 37*a* is formed outside the detection piece 37*b* in a radial direction of the fan type gear 37.

Further, a central angle of the detection piece 37a is larger than a central angle of the detection piece 37b.

A sensor 46 is disposed at a position where the detection piece 37a is passed. Two sensors 47 and 48 are disposed at positions where the detection piece 37b is passed. Specifically, the sensors 46 through 48 are photo interrupters having a light emitting part and a light receiving part which are oppositely disposed to each other. The sensor 46 is disposed at a position where the detection piece 37a is passed between a light emitting part and a light receiving part of the sensor 46. The sensors 47 and 48 are disposed at positions where the detection piece 37b is passed between light emitting parts and light receiving parts of the sensors 47 and 48. Further, the sensors 46 through 48 are mounted on a circuit board 49 which is fixed to a rear face of the frame plate 23.

In this embodiment, the following states are detected by combination of detected states (on/off states) of three sensors 46 through 48. In other words, a state (state shown in FIG. 8) that a height of the card storage part 16 disposed at the uppermost position is coincided with the height "H" of the card conveying passage 6, a state (state shown in FIG. 9A) that a height of the second card storage part 16 from the upper side is coincided with the height "H" of the card conveying passage 6, a state (state shown in FIG. 9B) that a height of the third card storage part 16 from the upper side is coincided with the height "H" of the card conveying passage 6, a state (state shown in FIG. 10A) that a height of the fourth card storage part 16 from the upper side is coincided with the height "H" of the card conveying passage 6, a state (state shown in FIG. 10B) that a height of the lowest card storage part 16 is coincided with the height "H" of the card conveying passage 6, and a state (state shown in FIG. 10C) that the height of the lowest card storage part 16 is higher than the height "H" of the card conveying passage 6 are detected. In this embodiment, a cassette position detection mechanism for detecting the position of the card storage cassette 11 in the upper and lower direction is structured by the detection pieces 37a and 37b and the sensors 46 through 48.

The conveying roller 14 and the pad roller 15 are attached to a front end side portion of the card storage and ejection module 4. The conveying roller 14 and the pad roller 15 are oppositely disposed to each other in the upper and lower direction. Further, the conveying roller 14 is disposed on an upper side and the pad roller 15 is disposed on a lower side. The conveying roller 14 is connected with a motor 52 for driving the conveying roller 14. Specifically, the conveying roller 14 is connected with the motor 52 through a power transmission mechanism 53 for transmitting power of the motor 52 to the conveying roller 14. The power transmission mechanism 53 includes a rotation shaft 54 to which the conveying roller 14 is fixed and a gear train 55 for transmitting power of the motor 52 to the rotation shaft 54. The rotation shaft 54 is rotatably held by the frame plate 22. The pad roller 15 is urged toward the conveying roller 14 (in other words, toward the upper side) by an urging member 56 such as a compression coil spring.

The impeller 19 is provided with a rotor body 19a which is formed in a roller shape (cylindrical shape) and a plurality of blades 19b which are formed so as to extend from an outer peripheral face of the rotor body 19a toward its outer side. An outer diameter of the rotor body 19a is set to be substantially equal to an outer diameter of the conveying roller 14. The blade 19b is formed in a substantially rectangular flat plate shape. Further, a plurality of the blades 19b is formed so as to extend radially outside from an outer peripheral face of the rotor body 19a. The number of the blades 19b is not limited to eight and may be two or four. Further, the blade 19b is formed of an elastic member. For example, the blade 19b is formed of rubber. In this embodiment, the entire impeller 19 is formed of an elastic member such as rubber but the rotor body 19a may be formed of a member other than an elastic member. Further, a plurality of the blades 19b may be formed so as to extend in a spiral shape outside the rotor body 19a from an outer peripheral face of the rotor body 19a. In FIG. 6, the blades 19b are not shown.

The impeller 19 is attached to the rotation shaft 54. In other words, the conveying roller 14 and the impeller 19 are coaxially disposed with each other. Further, the impeller 19 is connected with the motor 52 through the power transmission mechanism 53. A one-way clutch "CL" is disposed between the rotation shaft 54 and the impeller 19. In a case that a rotating direction of the impeller 19 when a card 2 is to be fed into the card storage part 16 (clockwise direction in FIG. 7) is referred to as a first rotating direction and a reverse rotating direction (counterclockwise direction in FIG. 7) is referred to as a second rotating direction, the one-way clutch "CL" transmits power in the first rotating direction of the motor 52 to the impeller 19 but cuts off transmission of power in the second rotating direction of the motor 52 to the impeller 19. In other words, when the motor 52, in other words, the rotation shaft 54 is rotated so that the impeller 19 is rotated in the first rotating direction, the impeller 19 is rotated by the power of the motor 52. Further, in a case that the rotation shaft 54 is rotated by the motor 52 in the second rotating direction, power transmission in the second rotating direction of the motor 52 to the impeller 19 is cut off and thus the impeller 19 is set in a freely rotatable state. On the other hand, in a stopped state of the rotation shaft 54, for example, when an external force is applied to the blades 19b of the impeller 19, the blades 19b of the impeller 19 can be freely rotated in the first direction but is unable to rotate in the second direction. A structure of such the one-way clutch "CL" has been known and thus its detailed description and drawing are omitted.

The conveying roller 14, the pad roller 15 and the impeller 19 are disposed between support parts 16a formed on both sides in the right and left direction. Further, the conveying roller 14, the pad roller 15 and the rotor body 19a of the impeller 19 are disposed to a front side of a front end of the card storage cassette 11 so as not to interfere with an elevating and lowering operation of the card storage cassette 11. On the other hand, the blades 19b of the impeller 19 are, as shown in FIG. 7, capable of entering into an inside of the card storage cassette 11 (inside of the card storage part 16). Therefore, when the impeller 19 is rotated in the first rotating direction, the blade 19b is contacted with a card 2 and the card 2 is fed into the card storage part 16.

The card detection mechanism 17 includes five detection levers 59 which are respectively turnably attached to side face parts of five card storage parts 16 and one sensor 60 which is attached to the support frame 13. The detection lever 59 is formed in a long and thin bar shape in the front and rear direction and is attached to the card storage part 16 so as to be capable of turning with the upper and lower direction as an axial direction of turning. A card contact part 59a which is capable of contacting with a side face of a rear end portion of a card 2 is formed on a rear end side of the detection lever 59 (see FIG. 6). Further, the detection lever 59 is urged in a direction that the card contact part 59a contacts with a side face of a card 2 (clockwise direction in FIG. 6) by an urging member 61 such as a torsion coil spring. The detection lever 59 is turned against an urging force of the urging member 61 when a card 2 is stored in the card storage part 16 and a rear end portion of the card 2 is contacted with the card contact part 59*a*.

The sensor 60 is a photo interrupter having a light emitting part and a light receiving part which are oppositely disposed to each other and is mounted on the circuit board 49. In other words, the sensor 60 is attached to the support frame 13 through the circuit board 49 and the like. Further, the sensor 60 is disposed at a position where a rear end portion of the detection lever 59 attached to the card storage part 16 disposed at the position coincided with the card conveying passage 6 in the upper and lower direction (in other words, the card storage part 16 disposed at the same height as the height "H" of the card conveying passage 6) is capable of intercepting light from the light emitting part to the light receiving part of the sensor 60. In this embodiment, it is detected whether a card 2 has been stored in the card storage part 16 or not on the basis of a detection result that a rear end portion of the detection lever 59 attached to the card storage part 16 which is disposed at the same height as the height "H" of the card conveying passage 6 is detected by the sensor 60 or not. Therefore, in this embodiment, the sensor 60 is structured to detect only a card in the card storage part 16 located at a position where the card 2 can be conveyed between the card reader and the card storage part 16. Accordingly, in order to detect whether a card 2 has been stored in each of the five card storage parts 16 or not, the card storage cassette 11 is required to be elevated and lowered by the lifting mechanism 12.

The card pushing-out mechanism 18 includes one pushing lever 63 turnably held by the support frame 13 and one solenoid 64 as a drive source for turning the pushing lever 63. The card pushing-out mechanism 18 performs, similarly to the card detection mechanism 17, a pushing-out operation of a card 2 only for the card storage part 16 located at a position where the card 2 can be conveyed between the card reader and the card storage part 16. The pushing lever 63 is turnably held by the frame plate 23 through a predetermined member so as to be turnable with the upper and lower direction as an axial direction of turning. The solenoid 64 is attached to a rear face of the frame plate 23. The pushing lever 63 and the solenoid 64 are connected with each other through a predetermined member such as a lever.

When the solenoid 64 is not energized, the pushing lever 63 is retreated to a rear face side of the frame plate 23 as shown by the two-dot chain line in FIG. 6. In other words, the pushing lever 63 is retreated from a range that the card storage cassette 11 is lifted and lowered. In this state, when electric power is supplied to the solenoid 64, the pushing lever 63 is turned so as to protrude to the front face side of the frame plate 23. As a result, the pushing lever 63 is contacted with a rear end face of a card 2 which is stored in the card storage part 16 disposed at the same height as the height "H" of the card conveying passage 6 to push out the card 2 toward the card conveying passage 6. In other words, the pushing lever 63 is contacted with a card 2 and the card 2 is pushed out toward the card conveying passage 6.

(Operation of Card Processing Apparatus)

In the card processing apparatus 1, when the card processing apparatus 1 receives a card collection command for storing a card 2 in the card conveying passage 6 to a card storage part 16 from a host equipment, the lifting mechanism 12 moves the card storage cassette 11 up or down so that the height of the card storage part 16 in which the card 2 is to be stored is coincided with the height "H" of the card conveying passage 6. In this case, a lifting and lowering amount of the card storage cassette 11 by the lifting mechanism 12 is controlled based on detected results of the sensors 46 through 48. Further, when the card storage cassette 11 is moved until that the height of the card storage part 16 in which the card 2 is to be stored is coincided with the height "H" of the card conveying passage 6, it is determined whether the card 2 has been stored in the card storage part 16 or not at the position coincided with the height "H" of the card conveying passage 6 based on a detected result by the card detection mechanism 17 (in other words, a detected result by the sensor 60).

When a card 2 is not stored in the card storage part 16 which has been moved to the position coincided with the height "H" of the card conveying passage 6, the card reader 3 ejects the card 2 to the rear side. Further, the conveying roller 14 is rotated to convey the card 2 ejected from the card reader 3 toward the card storage part 16. Further, the impeller 19 is rotated to feed the card 2 into the card storage part 16. In this embodiment, in a case that a card 2 is stored in the card storage part 16 having been moved to the position coincided with the height "H" of the card conveying passage 6, the card storage cassette 11 is lifted or lowered so that a height of another card storage part 16 is coincided with the height "H" of the card conveying passage 6 and then it is determined again whether a card 2 is stored in the card storage part 16 having been moved to the position coincided with the height "H" of the card conveying passage 6 or not.

Further, in the card processing apparatus 1, when the card processing apparatus 1 receives a card ejection command from a host equipment for ejecting a card 2 stored in the card storage part 16 toward the card reader 3, the lifting mechanism 12 moves the card storage cassette 11 up or down so that the height of the card storage part 16 where the card 2 to be ejected is stored is coincided with the height "H" of the card conveying passage 6. In this case, a lifting and lowering amount of the card storage cassette 11 by the lifting mechanism 12 is controlled based on detected results of the sensors 46 through 48. Further, when the card storage cassette 11 is moved to the position where the height of the card storage part 16 is coincided with the height "H" of the card conveying passage 6, it is determined whether the card 2 is stored in the card storage part 16 having been moved to the position coincided with the height "H" of the card conveying passage 6 or not based on a detected result by the card detection mechanism 17 (in other words, a detected result by the sensor 60).

When a card 2 is stored in the card storage part 16 having been moved to the position coincided with the height "H" of the card conveying passage 6, the solenoid 64 is activated and the pushing lever 63 is turned and thereby the card 2 stored in the card storage part 16 is pushed out toward the card conveying passage 6. Further, the conveying roller 14 is rotated to convey the card 2 pushed out by the pushing lever 63 toward the card conveying passage 6 and the card 2 is taken into the card reader 3. After that, the card reader 3 ejects the card 2 to a front side of the card reader 3 based on a command from the host equipment.

After the card 2 is taken into the card reader 3, there may be a case that the card processing apparatus 1 receives a card collection command from the host equipment for storing the card 2 in the card storage box 25. In this case, when the card 2 is completely taken into the card conveying passage 6, the lifting mechanism 12 moves the card storage cassette 11 upward so that the height of the card storage part 16 disposed on the lowest becomes higher than the height "H" of the card conveying passage 6. A lifting amount of the card storage cassette 11 by the lifting mechanism 12 is controlled based on detected results of the sensors 46 through 48. After that, the card reader 3 ejects the card 2 to a rear side and the conveying roller 14 is rotated to convey the card 2 ejected from the card reader 3 toward the card storage box 25. Further, the impeller 19 is rotated to feed the card 2 into the card storage box 25.

(Principal Effects in this Embodiment)

As described above, in this embodiment, the lifting mechanism 12 structured to lift and lower the card storage cassette 11 includes a parallel link mechanism 27 for lifting and lowering the card storage cassette 11 in a state that a horizontal posture of the card storage cassette 11 is maintained. Therefore, according to this embodiment, a smooth lifting and lowering operation of the card storage cassette 11 can be performed by using the parallel link mechanism 27. Further, in this embodiment, two link arms 28 and 29 structuring the parallel link mechanism 27 are disposed in a parallel arranged state in the right and left direction. Therefore, according to this embodiment, in comparison with a case that a guide shaft and a guide bush are provided like the card collecting and processing apparatus described in the above-mentioned Patent Literature, a length in the upper and lower direction of the lifting mechanism 12 can be shortened. Accordingly, in this embodiment, even when a smooth lifting and lowering operation of the card storage cassette 11 is performed, the size in the upper and lower direction of the card storage and ejection module 4 can be reduced.

In this embodiment, the link arm 28 whose one end side is fixed to the turning shaft 33 and the link arm 29 whose one end side is fixed to the turning shaft 34 are turned by power of the motor 30 in a synchronized manner with the one end sides of the link arms 28 and 29 as turning centers. Therefore, according to this embodiment, when the card storage cassette 11 is to be lifted and lowered by the lifting mechanism 12, the card storage cassette 11 can be lifted and lowered under a state that a horizontal posture of the card storage cassette 11 is surely maintained.

In this embodiment, the card detection mechanism 17 includes five detection levers 59 which are turnably attached to respective five card storage parts 16 and one sensor 60 attached to the support frame 13. In the card detection mechanism 17, it is detected whether a card 2 is stored in the card storage part 16 or not based on whether a rear end portion of the detection lever 59 attached to the card storage part 16 which is disposed at the same height as the height "H" of the card conveying passage 6 is detected by the sensor 60 or not. In other words, in this embodiment, the sensor for detecting a card 2 stored in the card storage part 16 is not provided in the card storage cassette 11. Therefore, according to this embodiment, wiring lines for the sensor are not required to be connected with the card storage cassette 11 which is performed with a lifting and lowering operation and thus leading-out of wiring lines for the sensor 60 is easy when the card storage and ejection module 4 is to be assembled. Further, according to this embodiment, disconnection of wiring lines for the sensor 60 is hard to be occurred.

In this embodiment, the impeller 19 for feeding a card 2 ejected from the card reader 3 into the card storage part 16 is provided with a plurality of blades 19b which are formed so as to extend outside from the outer peripheral face of the rotor body 19a. Further, a plurality of the blades 19b is formed of an elastic member and is formed so as to be capable of entering into an inside of the card storage part 16. Therefore, according to this embodiment, even when a card 2 which is to be stored in the card storage part 16 is not completely fed into the card storage part 16 by the conveying roller 14, the card 2 to be stored in the card storage part 16 can be completely fed into the card storage part 16 by the blades 19b. In other words, according to this embodiment, a card 2 which is to be stored in the card storage part 16 can be completely taken into the card storage part 16 by utilizing the blades 19b. Further, a bounce to a front side of a card 2 to be stored in the card storage part 16 can be prevented by a plurality of the blades 19b. Therefore, in this embodiment, interference of a card 2 stored in the card storage part 16 with a structural component of the card storage and ejection module 4 can be prevented when the card storage cassette 11 is moved up and down.

In this embodiment, the impeller 19 is attached to the rotation shaft 54 and is connected with the motor 52 for driving the conveying roller 14 through the power transmission mechanism 53. Therefore, according to this embodiment, the conveying roller 14 and the impeller 19 are driven by the common motor 52. Therefore, according to this embodiment, a structure of the card storage and ejection module 4 can be simplified. Further, in this embodiment, the one-way clutch "CL" is disposed between the rotation shaft 54 and the impeller 19. Therefore, when a stored card is to be ejected, an operation can be prevented that another card 2 different from the card to be ejected is pulled out by the impeller 19 due to a rotating force of the rotation shaft 54 which is rotated in the second rotating direction. If the impeller 19 is integrally rotated with the rotation shaft 54 in the second rotating direction when a card 2 is to be ejected, a force in an ejecting direction may be applied to another stored card when the blade 19b is contacted with the another stored card 2 and, as a result, the another stored card 2 may be pulled out. In this case, when a lifting and lowering operation of the card storage part 16 is performed, a problem may be occurred that the pulled-out another card 2 and a structural component of the card storage and ejection module 4 may be interfered with each other. However, according to this embodiment, since the one-way clutch "CL" is disposed between the rotation shaft 54 and the impeller 19, occurrence of the problem can be prevented.

In this embodiment, a card 2 stored in the card storage part 16 is pushed out from the card storage part 16 toward the card conveying passage 6 by one pushing lever 63 which is turnably held by the support frame 13. Therefore, according to this embodiment, in comparison with a case that each of a plurality of the card storage parts 16 is provided with a mechanism for pushing out a card 2 like the card collecting and processing apparatus described in the above-mentioned Patent Literature, a structure of the card pushing-out mechanism 18 can be simplified.

(Other Embodiments)

Although the present invention has been shown and described with reference to a specific embodiment, various changes and modifications will be apparent to those skilled in the art from the teachings herein.

In the embodiment described above, the parallel link mechanism 27 is provided with two link arms 28 and 29. However, the present invention is not limited to this embodiment. For example, the parallel link mechanism 27 may be provided with three or more link arms. In this case, three link arms are formed in the same shape as each other and are disposed so as to be a parallel aligned state in the right and left direction. Further, in the embodiment described above, the gear train 31 includes the gears 41 through 43. However, the gear train 31 may include no gears 41 through 43. In this case, the lifting mechanism 12 may include a motor for turning the turning shaft 34 in addition to the motor 30 or may include no motor for turning the turning shaft 34. When the lifting mechanism 12 includes a motor for turning the turning shaft 34 in addition to the motor 30, two motors are synchronously rotated so that the link arm 28 and the link arm 29 are simultaneously turned by the same angle with one end sides of the link arms 28 and 29 as turning centers.

In the embodiment described above, the card detection mechanism 17 includes five detection levers 59 each of which is turnably attached to each of five card storage parts 16 and one sensor 60 which is attached to the support frame 13. However, the present invention is not limited to this embodiment. For example, the card detection mechanism 17 may include five detection levers 59 each of which is turnably attached to each of five card storage parts 16 and five sensors each of which is attached to each of five card storage parts 16. In other words, a detection mechanism for detecting one card 2 may be provided in each of five card storage parts 16.

In the embodiment described above, the conveying roller 14 and the impeller 19 are coaxially disposed with each other. However, it may be structured that the conveying roller 14 and the impeller 19 are not coaxially disposed with each other. Further, in the embodiment described above, the one-way clutch "CL" is disposed between the rotation shaft 54 and the impeller 19. However, although the blade 19b of the impeller 19 is contacted with a card 2 at the time of lifting and lowering of the card storage cassette 11, if a force for pulling out the card 2 from the card storage part 16 is not applied to the card 2, it may be structured that no one-way clutch is disposed between the rotation shaft 54 and the impeller 19. Further, in the embodiment described above, a drive source for turning the pushing lever 63 is the solenoid 64 but a drive source for turning the pushing lever 63 may be a motor.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card storage and ejection module structured to perform a card storing operation for storing a card ejected from a card reader and a card ejecting operation for ejecting a stored card toward the card reader, the card storage and ejection module comprising:
    a card storage cassette comprising a plurality of card storage parts each of which stores one card;
    a lifting mechanism structured to lift and lower the card storage cassette; and
    a support frame which supports the card storage cassette so that the card storage cassette can be being lifted and lowered;
    wherein a plurality of the card storage parts is disposed so as to be overlapped with each other in an upper and lower direction; and
    wherein the lifting mechanism comprises a parallel link mechanism having at least two link arms which connect the support frame with the card storage cassette and are disposed in an aligned state in a horizontal direction so as to be parallel to each other for lifting and lowering the card storage cassette in a state that a horizontal posture of the card storage cassette is maintained.

2. The card storage and ejection module according to claim 1, wherein
    the parallel link mechanism is comprised of the two link arms,
    the lifting mechanism comprises a motor and a gear train for transmitting power of the motor to the two link arms,
    one end side of each of the two link arms is turnably connected with the support frame,
    an other end side of each of the two link arms is turnably connected with the card storage cassette, and
    the two link arms are turned in a synchronized manner by the power of the motor with the one end sides of the two link arms as turning centers.

3. The card storage and ejection module according to claim 1, further comprising a card detection mechanism structured to detect that a card is stored in the card storage part,
    wherein the card detection mechanism comprises:
        a plurality of detection levers each of which is turnably attached to each of a plurality of the card storage parts, each of the detection levers being turned when the card is stored in the card storage part; and
        one sensor which is attached to the support frame, and
    wherein the sensor is structured to detect whether the card is stored in the card storage part based on whether the detection lever attached to the card storage part which is disposed at a position coincided with a card conveying passage of the card reader in the upper and lower direction is detected by the sensor.

4. The card storage and ejection module according to claim 3, further comprising an impeller structured to feed the card ejected from the card reader into the card storage part,
    wherein the impeller comprises:
        a rotor body; and
        a plurality of blades which are formed of an elastic member and are formed so as to extend from an outer peripheral face of the rotor body to an outer peripheral side of the rotor body for feeding the card into the card storage part by contacting with the card.

5. The card storage and ejection module according to claim 4, further comprising a conveying roller which is disposed between the card reader and the card storage cassette and is structured to convey the card,
    wherein the conveying roller and the impeller are coaxially disposed each other.

6. The card storage and ejection module according to claim 5, further comprising:
    a motor structured to drive the conveying roller; and
    a power transmission mechanism structured to transmit power of the motor to the conveying roller,
    wherein the motor is connected with the impeller through the power transmission mechanism, and
    wherein when a rotating direction of the impeller for feeding the card into the card storage part is referred to as a first rotating direction, the power transmission mechanism comprises a one-way clutch which transmits power in the first rotating direction of the motor to the impeller.

7. The card storage and ejection module according to claim 6, further comprising a card pushing-out mechanism structured to push out a card from the card storage part toward the card conveying passage of the card reader,
    wherein the card pushing-out mechanism comprises:

one pushing lever which is turnably held by the support frame and is structured to contact with the card and push out the card toward the card conveying passage; and a drive source which is attached to the support frame and is structured to turn the pushing lever.

8. The card storage and ejection module according to claim 7, wherein the pushing lever is disposed at a position coincided with the card conveying passage of the card reader in the upper and lower direction, and when the drive source is not driven, the pushing lever is retreated from the card storage cassette and, when the drive source is driven, the pushing lever pushes out the card stored in the card storage part located at a height coincided with the card conveying passage of the card reader.

9. The card storage and ejection module according to claim 1, wherein a plurality of the card storage parts is displaced from each other in a direction perpendicular to a card conveying direction so as to correspond to a lifting and lowering operation by the parallel link mechanism.

10. A card storage and ejection module structured to perform a card storing operation for storing a card ejected from a card reader and a card ejecting operation for ejecting a stored card toward the card reader, the card storage and ejection module comprising:

a card storage cassette comprising a plurality of card storage parts each of which stores one card;

a lifting mechanism structured to lift and lower the card storage cassette;

a support frame which supports the card storage cassette so that the card storage cassette can be lifted and lowered; and an impeller structured to feed the card ejected from the card reader into the card storage part;

wherein a plurality of the card storage parts is disposed so as to be overlapped with each other in an upper and lower direction; and wherein the impeller comprises:
a rotor body; and
a plurality of blades which are formed of an elastic member and are formed so as to extend from an outer peripheral face of the rotor body to an outer peripheral side of the rotor body for feeding the card into the card storage part by contacting with the card.

11. The card storage and ejection module according to claim 10, further comprising a conveying roller which is disposed between the card reader and the card storage cassette for conveying the card, and wherein the conveying roller and the impeller are coaxially disposed each other.

12. The card storage and ejection module according to claim 11, wherein a plurality of the blades is formed so as to extend from the outer peripheral face of the rotor body in a radial shape or in a spiral shape.

13. The card storage and ejection module according to claim 11, wherein the lifting mechanism comprises a parallel link mechanism having two link arms which connect the support frame with the card storage cassette and are disposed in an aligned state in a horizontal direction so as to be parallel to each other for lifting and lowering the card storage cassette in a state that a horizontal posture of the card storage cassette is maintained.

14. The card storage and ejection module according to claim 13, wherein the two link arms are turned in a synchronized manner by power of a motor with one end sides of the two link arms as turning centers, and turning shafts of the two link arms are provided so as to be perpendicular to a shaft on which the conveying roller and the impeller are disposed.

15. The card storage and ejection module according to claim 14, wherein a plurality of the card storage parts is displaced from each other in a direction perpendicular to a card conveying direction so as to correspond to a lifting and lowering operation by the parallel link mechanism.

16. The card storage and ejection module according to claim 10, further comprising:

a card pushing-out mechanism structured to push out a card from the card storage part toward the card conveying passage of the card reader;

a conveying roller which is disposed between the card reader and the card storage cassette for conveying the card;

a motor structured to drive the conveying roller; and a power transmission mechanism structured to transmit power of the motor to the conveying roller;

wherein the motor is connected with the impeller through the power transmission mechanism, and wherein when a rotating direction of the impeller for feeding the card into the card storage part is referred to as a first rotating direction, the power transmission mechanism comprises a one-way clutch which transmits the power in the first rotating direction of the motor to the impeller.

17. A card storage and ejection module structured to perform a card storing operation for storing a card ejected from a card reader and a card ejecting operation for ejecting a stored card toward the card reader, the card storage and ejection module comprising:

a card storage cassette comprising a plurality of card storage parts each of which stores one card;

a lifting mechanism structured to lift and lower the card storage cassette;

a support frame which supports the card storage cassette so that the card storage cassette can be lifted and lowered; and a card pushing-out mechanism structured to push out a card from the card storage part toward the card conveying passage of the card reader;

wherein a plurality of the card storage parts is disposed so as to be overlapped with each other in an upper and lower direction; and wherein the card pushing-out mechanism comprises:
one pushing lever which is turnably held by the support frame and is structured to contact with the card and push out the card toward the card conveying passage; and a drive source which is attached to the support frame and is structured to turn the pushing lever.

18. The card storage and ejection module according to claim 17, wherein the pushing lever is disposed at a position coincided with the card conveying passage of the card reader in the upper and lower direction, and when the drive source is not driven, the pushing lever is retreated from the card storage cassette and, when the drive source is driven, the pushing lever pushes out the card stored in the card storage part located at a height coincided with the card conveying passage of the card reader.

19. The card storage and ejection module according to claim 17, wherein the lifting mechanism comprises a parallel link mechanism having two link arms which connect the support frame with the card storage cassette and are disposed in an aligned state in a horizontal direction so as to be parallel to each other for lifting and lowering the card storage cassette in a state that a horizontal posture of the card storage cassette is maintained.

20. The card storage and ejection module according to claim 19, further comprising:
- a conveying roller which is disposed between the card reader and the card storage cassette for conveying the card; and
- an impeller structured to feed the card ejected from the card reader into the card storage part,
- wherein the two link arms are turned in a synchronized manner by power of a motor with one end sides of the two link arms as turning centers, and
- wherein turning shafts of the two link arms are provided so as to be perpendicular to a shaft on which the conveying roller and the impeller are disposed.

21. The card storage and ejection module according to claim 20, further comprising a plurality of the card storage parts is displaced from each other in a direction perpendicular to a card conveying direction so as to correspond to a lifting and lowering operation by the parallel link mechanism.

22. The card storage and ejection module according to claim 21, further comprising a card detection mechanism structured to detect that a card is stored in the card storage part,
wherein the card detection mechanism comprises:
- a plurality of detection levers each of which is turnably attached to each of a plurality of the card storage parts, each of the detection levers being turned when the card is stored in the card storage part; and
- one sensor which is attached to the support frame, and
wherein the sensor is structured to detect whether the card is stored in the card storage part based on whether the detection lever attached to the card storage part which is disposed at a position coincided with the card conveying passage of the card reader in the upper and lower direction is detected by the sensor.

* * * * *